(12) United States Patent
Evans et al.

(10) Patent No.: US 6,671,148 B2
(45) Date of Patent: Dec. 30, 2003

(54) ELECTRONIC COMMUNICATING RESIDENTIAL CIRCUIT BREAKER

(75) Inventors: Scott C. Evans, Burnt Hills, NY (US); Richard Dudley Baertsch, Scotia, NY (US)

(73) Assignee: General Electric Company, Schenectady, NY (US)

( * ) Notice: Subject to any disclaimer, the term of this patent is extended or adjusted under 35 U.S.C. 154(b) by 196 days.

(21) Appl. No.: 09/681,957

(22) Filed: Jun. 29, 2001

(65) Prior Publication Data

US 2003/0002234 A1 Jan. 2, 2003

(51) Int. Cl.[7] .................................. H02H 3/00
(52) U.S. Cl. ........................ 361/64; 361/115
(58) Field of Search ............... 361/62, 64, 66, 361/68, 69, 104, 114, 115, 99, 100, 101, 102; 307/29, 38–41, 85, 86; 700/3, 8, 20, 21, 22, 286, 292, 293, 295

(56) References Cited

U.S. PATENT DOCUMENTS

| | | | |
|---|---|---|---|
| 5,861,683 A | * | 1/1999 | Engel et al. ................ 307/38 |
| 6,084,758 A | * | 7/2000 | Clarey et al. ............... 361/62 |
| 6,130,412 A | | 10/2000 | Sizemore ............... 340/825.72 |
| 6,195,243 B1 | | 2/2001 | Spencer et al. ............. 361/64 |
| 6,212,049 B1 | | 4/2001 | Spencer et al. ............. 361/64 |
| 6,247,919 B1 | | 6/2001 | Welz, Jr. et al. ............ 431/13 |
| 6,285,917 B1 | | 9/2001 | Sekiguchi et al. .......... 700/239 |
| 6,297,939 B1 | | 10/2001 | Bilac et al. ................ 700/239 |
| 6,310,560 B2 | | 10/2001 | Weynachter .......... 340/870.11 |
| 6,316,889 B1 | | 11/2001 | Chansky et al. ............ 361/600 |
| 6,356,426 B1 | * | 3/2002 | Dougherty .................. 361/102 |
| 6,396,166 B1 | * | 5/2002 | Kim .......................... 307/38 |

* cited by examiner

Primary Examiner—Ronald W. Leja
(74) Attorney, Agent, or Firm—Armstrong Teasdale LLP; Robert B. Reeser, III

(57) ABSTRACT

A system for communicating with a residential electrical load center, including a residential electrical wiring system and at least one electronic communicating circuit breaker. The electronic communicating circuit breaker includes a fuse protected communications and control module. The system provides power to the fuse protected communications and control module utilizing the residential electrical wiring system, and operates the electronic communicating circuit breaker utilizing the fuse protected communications and control module regardless of whether the electronic communicating circuit breaker is in an 'Open' or 'Closed' state.

30 Claims, 2 Drawing Sheets

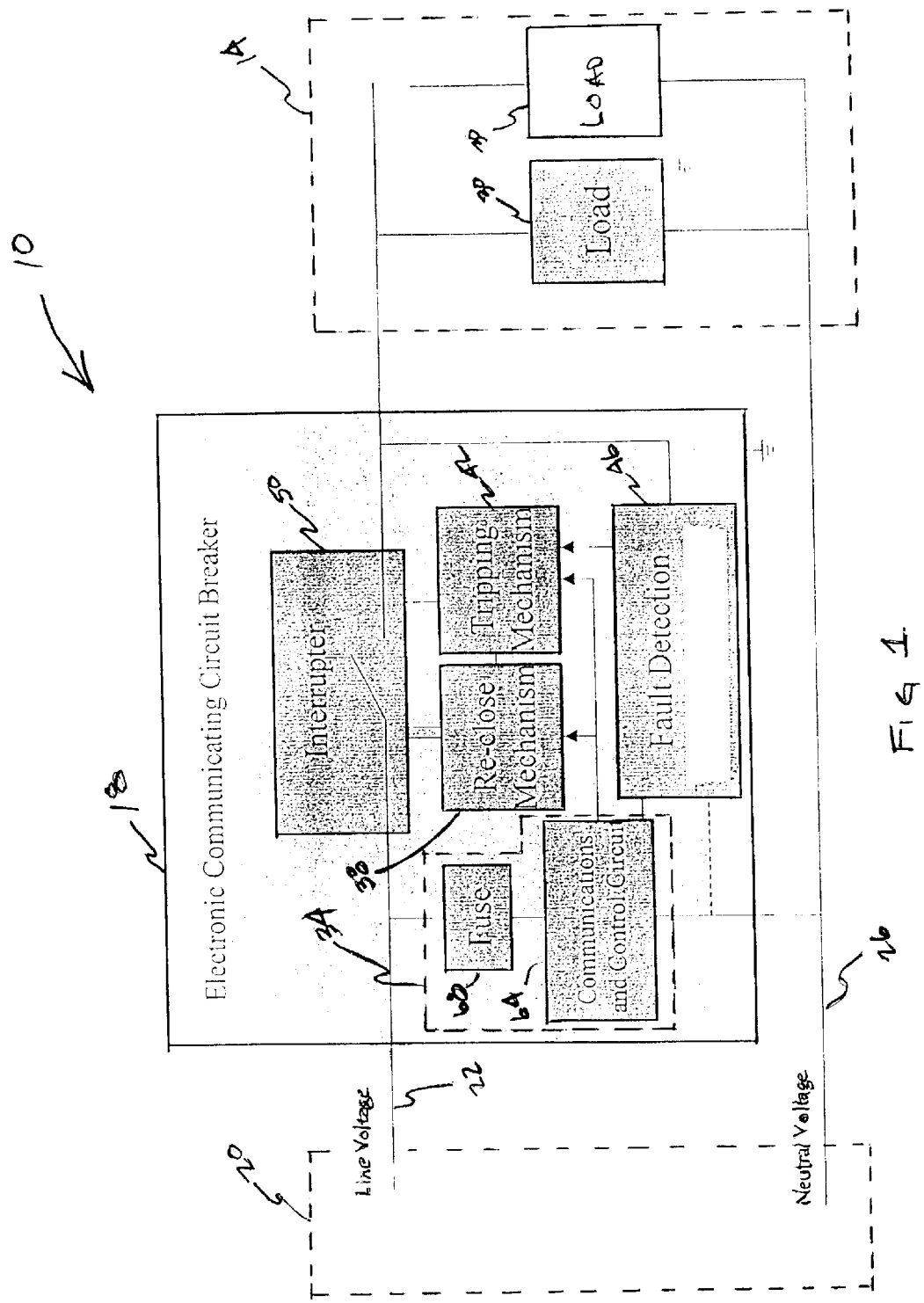

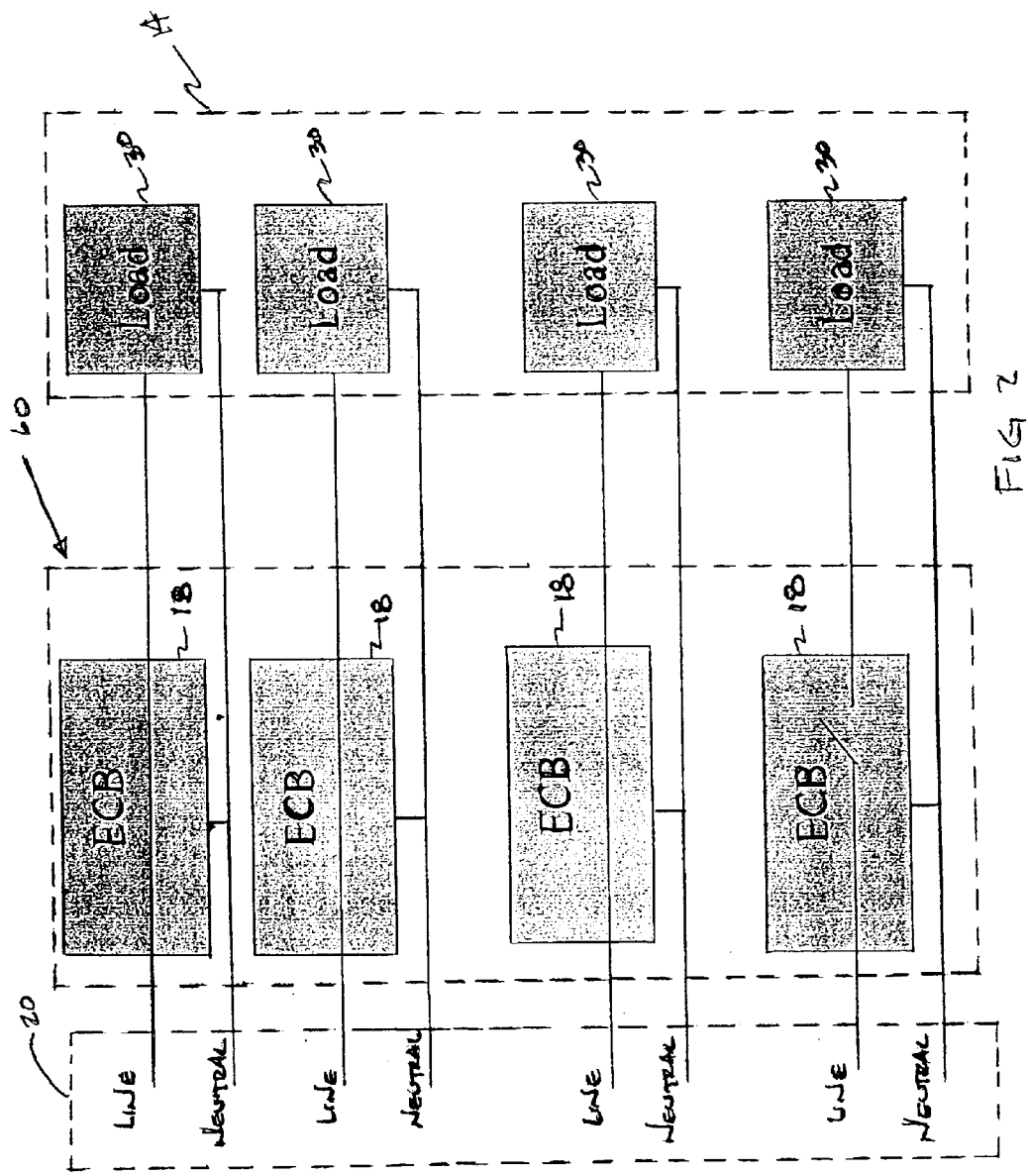

ELECTRONIC COMMUNICATING RESIDENTIAL CIRCUIT BREAKER

BACKGROUND OF INVENTION

This invention relates generally to circuit breakers, and more particularly, to electronic communicating residential circuit breakers.

The ability to communicate to residential circuit breakers enables numerous value adding functions and applications, such as lighting control, load shedding and remote diagnostics. Additionally, transmission of data throughout a residence facilitates performing home automation functions such as home security and appliance controls. Communicating to residential circuit breakers has generally involved separate communications wiring and power that is available when the breaker is both open and closed and a separate power supply to power a re-close motor. However, separate communications wiring and power supply increases the cost and complexity implementing communicating residential circuit breakers. Residential electrical systems can be used for data communication within a residence. For existing residences, wiring in the electrical systems is advantageous to use because, in most instances, use of such wiring facilitates installation of a communication system.

Additionally, data can be transmitted over a residential electrical wiring system. In such a system, due to residential wiring conventions, a large percentage of data transmissions are routed through a load center, sometimes called a breaker box or fuse box. The load center is the incoming point for electrical service to the residence and wiring for the residence branches out from the load center. The load center includes a plurality of fuses or circuit breakers for the protection of the various circuits within the residence.

The elimination of the separate power supply and communications wiring would reduce cost and simplify the installation process. Thus, it would be desirable to eliminate separate power supply and communications wiring in a communicating residential electrical system.

SUMMARY OF INVENTION

In one embodiment, a method is provided for communicating with a residential electrical load center that includes at least one electronic communicating circuit breaker electrically connected to a residential electrical wiring system, wherein the electronic communicating circuit breaker includes a fuse protected communications and control module. The method includes the steps of providing power to the fuse protected communications and control module utilizing the residential electrical wiring system and operating the electronic communicating circuit breaker utilizing the fuse protected communications and control module.

In another embodiment, a system is provided for communicating with a residential electrical load center comprising a residential electrical wiring system and at least one electronic communicating circuit breaker electrically connected to the residential electrical wiring system. The electronic communicating circuit breaker comprises a fuse protected communications and control module, and the system is configured to provide power to the fuse protected communications and control module utilizing the residential electrical wiring system and operate the electronic communicating circuit breaker utilizing the fuse protected communications and control module.

In yet another embodiment, an electronic communicating circuit breaker is provided which is configured to be utilized in a residential load center and electrically connected to a residential electrical wiring system. The circuit breaker comprises a fuse protected communications and control module and at least one of a re-close mechanism, a tripping mechanism, a fault detection module, and an arc interrupter, said circuit breaker.

BRIEF DESCRIPTION OF DRAWINGS

FIG. 1 is a schematic diagram of a system for communicating with a residential load center in accordance with one embodiment of the present invention.

FIG. 2 is a diagram of one embodiment of a residential load center that utilizes the communication system illustrated in FIG. 1.

DETAILED DESCRIPTION

FIG. 1 is a schematic diagram of a system 10 for communicating with a residential load center in accordance with one embodiment of the present invention. System 10 includes a residential wiring system 14 and at least one electronic communicating circuit breaker 18 electrically connected to residential wiring system 14. Electronic communicating circuit breaker 18 is connected to a power source 20 by voltage line 22 and neutral line 26, thereby providing electrical power to residential wiring system 14 protected by electronic communicating circuit breaker 18. Residential wiring system 14 includes at least one load 30, which is electrically connected to circuit breaker 18 via residential wiring system 14. Electronic communicating circuit breaker 18 includes a fuse protected communications and control circuit 34 and at least one of a re-close mechanism 38, a tripping mechanism 42, a fault detection module 46, and an interrupter 50.

One side of electronic communicating circuit breaker 18 is connected to power source 20 while another side is connected to wiring system 14. Therefore, when electronic communicating circuit breaker 18 is in a 'Closed' state, power flows from power source 20 through electronic communicating circuit breaker 18 to load 30. One function of electronic communicating circuit breaker 18 is to provide protection to components using current flowing from electronic communicating circuit breaker 18, such as load 30, from damage caused by electrical anomalies such as overcurrent, undervoltage, arc fault, and ground fault conditions. Electronic communicating circuit breaker 18 provides protection by interrupting current, or removing power, to the down stream components when an electrical anomaly occurs. For example, in an overcurrent condition, fault detection module 46 senses parameters such as current in the line and neutral wires of load 30, and monitors for fault conditions. If a fault occurs, fault detection module 46 sends a tripping signal to tripping mechanism 42, which causes interrupter 50 to interrupt current flow through electronic communicating circuit breaker 18, placing electronic communicating circuit breaker 18 in an 'Open' state. Once circuit breaker 18 is in an 'Open' state, all power is removed from wiring system 14, and no current is allowed to flow to load 30 until electronic communicating circuit breaker is reset to the 'Closed' state.

Electronic communicating circuit breaker 18 also communicates with a controller (not shown) allowing the controller to perform functions and applications such as lighting and appliance control, home security management, load shedding, and remote diagnostics of electronic communicating circuit breaker 18 and load 30. Fuse protected communications and control module 34 allows communication with electronic communicating circuit breaker 18. More specifically, fuse protected communications and control module 34 includes a communication and control circuit 64 that enables and controls communication to and from electronic communicating circuit breaker 18, thereby providing remote operation and diagnostics of electronic communicating circuit breaker 18 and load 30. In an exemplary embodiment, the controller is connected to wiring system 14 anywhere that has power, and control circuit 64 enables power line communications such that wiring system 14 is utilized to transmit data among the controller, electronic communicating circuit breaker 18 and load 30. To communicate using wiring system 14, control circuit 64 utilizes a commercially available power line carrier protocol such as Lon Works, provided by Echelon Inc. In another embodiment other communication methods, such as cellular, radio frequency, and twisted power wire, are used to communicate among the controller, electronic communicating circuit breaker 18, and load 30.

Additionally, fuse protected communications and control module 34 includes fuse 68, which provides fault protection for control circuit 64. Fuse protected communications and control module 34 is located on the power source side of electronic communicating circuit breaker 18. If a fault occurs, fuse protected communications and control module 34 is not protected from damage by fault detection module 46, tripping mechanism 42, and interrupter 50. Therefore, communications and control module 34 incorporates fuse 68 to protect control circuit 64 and circuit breaker control modules, such as re-close mechanism 38, tripping mechanism 42, interrupter 50, and fault detection module 46, from possible damage caused by electrical anomalies.

Utilizing communications and control circuit 64, fuse protected communications and control module 34 controls operation of electronic communicating circuit breaker 18 by communicating with circuit breaker control modules such as fault detection module 46, re-close mechanism 38, tripping mechanism 42 and interrupter 50. For example, fuse protected communications and control module 34 controls the 'Opening' and 'Closing' of interrupter 50. To 'Open' interrupter 50, fuse protected communications and control module 34 sends a signal to tripping mechanism 42, which in turn sends a signal to interrupter 50 to interrupt the flow of current though electronic communicating circuit breaker 18 resulting in an 'Open' state of electronic communicating circuit breaker 18. In another example, fuse protected communications and control module 34 is used to re-close interrupter 50 returning electronic communicating circuit breaker to a 'Closed' state. When tripping conditions are safe for closure of electronic communicating circuit breaker 18, fuse protected communications and control module 34 sends a signal to re-close mechanism 38. Re-close mechanism 38 then causes interrupter 50 to close allowing current to flow from power source 20, through electronic communicating circuit breaker 18, to load 30. Re-close mechanism 38 is any device or mechanism capable of closing interrupter 50, such as a small motor, or a solenoid. Additionally, re-close mechanism 38 receives power from fuse protected communications and control module 34. Since fuse protected communications and control module 34 is located on the power source side of electronic communicating circuit breaker 18, power is available to re-close interrupter 50 when electronic communicating circuit breaker 18 is in both an 'Open' state and a 'Closed' state.

In another embodiment, fuse protected communications and control module 34 is used to control load 30, such as lighting fixtures, stereo equipment, and other adjustable devices by communicating with load 30 via wiring system 14.

In the exemplary embodiment, fuse protected communication and control module 34 communicates with fault detection module 46 to provide diagnosis of electrical flow through electronic communicating circuit breaker 18 and diagnosis of electrical anomalies that occur. Fault detection module 46 monitors parameters, such as current through electronic communicating circuit breaker 18, and when a fault occurs, provides diagnostic and amplifying data regarding the nature of the fault to fuse protected communications and control module 34. Fuse protected communications and control module 34 then sends the data to the controller. For example, fault detection module 46 transmits the status of monitored parameters to fuse protected communications and control module 34, and when a fault occurs, reports fault type information, such as overcurrent, undervoltage, and arc fault, and the electrical conditions that caused the fault.

Fuse protected communications and control module 34 is coupled between voltage line 22 and neutral line 26 on the power source side of electronic communicating circuit breaker 18. The circuit breaker control modules are coupled between fuse protected communications and control module 34 and the load side of electronic communicating circuit breaker 18. Having fuse protected communications and control module 34 coupled to the power source side, and the control modules coupled to the load side, allows communication among fuse protected communications and control module 34, the circuit breaker control modules, load 30, and the controller regardless of whether electronic communicating circuit breaker 18 is in the 'Open' state or the 'Closed' state.

FIG. 2 is a diagram of one embodiment of a residential load center 60 that utilizes communication system 10 illustrated in FIG. 1. Components in FIG. 2 identical to components in FIG. 1 are identified in FIG. 2 using the same reference numerals as used in FIG. 1. A supply of power (not shown) is routed from an electric supplier, either underground or otherwise, and is connected to a customer's residence or business (not shown) at an electric meter (not shown) at which point the electric wiring enters the customer residence providing power source 20 to load center 60. Load center 60 may also be called a fuse box or a breaker box. In one embodiment, inside load center 60, power source 20 is divided into individual circuits by a plurality of electronic communicating circuit breakers 18. The individual circuits form residential wiring system 14 and distribute electrical power throughout the residence to a plurality of loads 30.

Each electronic circuit breaker 18 is connected to one of a plurality of loads 30, which are included in residential wiring system 14. Load 30 is any device, or plurality of devices that draw electrical current. For example, load 30 can be a single device such as a clothes drier, a furnace, or a hot water heater, or load 30 can be multiple devices connected in parallel or multiple electrical outlets connected in parallel, such as a plurality of electrical outlets in one room supplying current to lights, fans, televisions, and stereo equipment. Each electronic communicating circuit breaker 18 includes a fuse protected communications and control module (shown in FIG. 1) that communicates, via wiring system 14, with each load 30 that is connected to the respective electronic communicating circuit breaker 18. Additionally, all electronic communicating circuit breakers 18 communicate with, and are controlled by, one controller. However, in an alternate embodiment, certain electronic circuit breakers 18 communicate with one controller, and other electronic communicating circuit breakers 18 communicate with a different controller. By using multiple controllers, designated sections of residential wiring system 14 are controlled by different controllers, allowing different areas of a residence to be individually controlled.

The electronic communicating circuit breaker utilizes a fuse protected control module to enable power line communications to a residential circuit breaker regardless of whether the breaker is 'Open' or 'Closed'. The fuse protected control module also provides power to a re-close mechanism when the breaker is in an 'Open' state, allowing remote closing of the circuit breaker without the need for a power source separate from the residential wiring power source. Functionality performed by the fuse protected communications and control module includes remote opening and closing of the circuit breaker as well as reporting diagnostic and amplifying data about the electronic communicating circuit breaker and the load connected to the circuit breaker.

While the invention has been described in terms of various specific embodiments, those skilled in the art will recognize that the invention can be practiced with modification within the spirit and scope of the claims.

What is claimed is:

1. A method for communicating with a residential electrical load center including at least one electronic communicating circuit breaker electrically connected to a residential electrical wiring system, the electronic communicating circuit breaker including a fuse protected communications and control module, said method including the steps of:
   providing power to the fuse protected communications and control module utilizing the residential electrical wiring system; and
   operating the electronic communicating circuit breaker utilizing the fuse protected communications and control module.

2. A method in accordance with claim 1 wherein said step of operating the electronic communicating circuit breaker comprises the step of utilizing the fuse protected communications and control module to communicate with the electronic communicating circuit breaker, when the circuit breaker is in one of an open state and a closed state.

3. A method in accordance with claim 1 wherein said step of operating the electronic communicating circuit breaker comprises the step of communicating with the electronic communicating circuit breaker utilizing the residential electrical wiring system and a power line carrier protocol.

4. A method in accordance with claim 1 wherein the electronic communicating circuit breaker further includes at least one of a re-close mechanism, a tripping mechanism, a fault detection module, and an arc interrupter, said step of operating the electronic communicating circuit breaker comprises the step of communicating with at least one of the re-close mechanism, the tripping mechanism, the fault detection module and the arc interrupter, when the circuit is in both an open state and a closed state, utilizing the fuse protected communications and control module.

5. A method in accordance with claim 4 wherein said step of communicating further comprises the step of reporting diagnostic information about the circuit breaker.

6. A method in accordance with claim 1 wherein the electronic communicating circuit breaker further includes at least one of a re-close mechanism, a tripping mechanism, a fault detection module, and an arc interrupter, said step of operating the electronic communicating circuit breaker comprises the step of controlling at least one of the re-close mechanism, the tripping mechanism, the fault detection module and the arc interrupter when the circuit breaker is in both an open state and a closed state by utilizing the fuse protected communications and control module.

7. A method in accordance with claim 6 wherein said steps of controlling comprises the steps of:
   opening the electronic communicating circuit breaker remotely; and
   closing the electronic communicating circuit breaker remotely using the re-close mechanism.

8. A method in accordance with claim 7 wherein said step of closing the electronic communicating circuit breaker remotely comprises the step of providing power to the re-close mechanism using the fuse protected communications and control module.

9. A method in accordance with claim 1 wherein the electronic communicating circuit breaker further includes a fault detection module, said step of operating the electronic communicating circuit breaker includes the step of providing protective functions of the breaker using the fault detection module.

10. A method in accordance with claim 1 wherein the electronic communicating circuit breaker further includes a fault detection module, said step of operating the electronic communicating circuit breaker includes the steps of:
    detecting a fault using the fault detection module;
    providing diagnostic data regarding the fault; and
    providing amplified data regarding the fault.

11. A system for communicating with a residential electrical load center, said system comprising a residential electrical wiring system and at least one electronic communicating circuit breaker electrically connected to said residential electrical wiring system, said electronic communicating circuit breaker comprising a fuse protected communications and control module, said system configured to:
    provide power to said fuse protected communications and control module utilizing the residential electrical wiring system; and
    operate said electronic communicating circuit breaker utilizing said fuse protected communications and control module.

12. A system in accordance with claim 11 wherein to operate the electronic communicating circuit breaker, said system further configured to utilize said fuse protected communications and control module to communicate with the electronic communicating circuit breaker when said circuit breaker is in one of an open state and a closed state.

13. A system in accordance with claim 11 wherein to operate said electronic communicating circuit breaker, said system further configured to communicate with the electronic communicating circuit breaker utilizing said residential electrical wiring system and a power line carrier protocol.

14. A system in accordance with claim 11, wherein said electronic communicating circuit breaker further comprises at least one of a re-close mechanism, a tripping mechanism, a fault detection module, and an arc interrupter, said system further configured to utilize said fuse protected communications and control module to communicate with at least one of said re-close mechanism, said tripping mechanism, said fault detection module and said arc interrupter when said electronic communicating circuit breaker is in both an open state and a closed state.

15. A system in accordance with claim 14 wherein to communicate said system further configured to report diagnostic information about said circuit breaker.

16. A system in accordance with claim 11, wherein said electronic controlled circuit breaker further comprising at least one of, a re-close mechanism, a tripping mechanism, a fault detection module, and an arc interrupter, said system further configured to utilize said fuse protected communications and control module to control at least one of said re-close mechanism, said tripping mechanism, said fault detection module and said arc interrupter when said circuit breaker is in both an open state and a closed state.

17. A system in accordance with claim 16 wherein said system further configured to:

open said circuit breaker remotely; and close said circuit breaker remotely using said re-close mechanism.

18. A system in accordance with claim 17 wherein to close said circuit breaker remotely said system further configured to provide power to said re-close mechanism using said fuse protected communications and control module.

19. A system in accordance with claim 11, wherein said electronic communicating circuit breaker further comprising a fault detection module, said system further configured to provide protective function of said circuit breaker using said fault detection module.

20. A system in accordance with claim 11, wherein said electronic communicating circuit breaker further comprising a fault detection module, said electronic communicating circuit breaker said system further configured to:

detect a fault using said fault detection module;

provide diagnostic data regarding the fault; and provide amplified data regarding the fault.

21. An electronic communicating circuit breaker configured to be utilized in a residential load center and electrically connected to a residential electrical wiring system, said circuit breaker comprising:

a fuse protected communications and control module; and at least one of a re-close mechanism, a tripping mechanism, a fault detection module, and an arc interrupter.

22. A breaker in accordance with claim 21 wherein said fuse protected communications and control module configured to enable communications with said circuit breaker when said circuit breaker is in one of an open state and a closed state.

23. A breaker in accordance with claim 21 wherein said fuse protected communications and control module configured to enable communications with said circuit breaker utilizing the residential electrical wiring system and a power line communications protocol.

24. A breaker in accordance with claim 21 wherein said fuse protected communications and control module configured to communicate with at least one of said re-close mechanism, said tripping mechanism, said fault detection module and said arc interrupter when said circuit breaker is in one of an open state and a closed state.

25. A breaker in accordance with claim 24 wherein said fuse protected communications and control module configured to report diagnostic information regarding the circuit breaker.

26. A breaker in accordance with claim 21 wherein said fuse protected communications and control module configured to control at least one of said re-close mechanism, said tripping mechanism, said fault detection module and said arc interrupter when said circuit breaker is one of an open state and a closed state.

27. A breaker in accordance with claim 26 wherein said fuse protected communications and control module configured to:

open said circuit breaker remotely; and close said circuit breaker remotely utilizing said re-close mechanism.

28. A breaker in accordance with claim 27 wherein to close said circuit breaker remotely, said fuse protected communications and control module further configured to provide power to said re-close mechanism.

29. A breaker in accordance with claim 21 wherein said fault detection module configured to provide protective functions of said circuit breaker.

30. A breaker in accordance with claim 21 wherein said fault detection module configured to:

detect a fault in the residential electrical wiring system;

provide diagnostic data regarding the fault; and provide amplified data regarding the fault.

* * * * *